P. FONTAINE AND F. K. ROBESON.
WIND DEFLECTOR.
APPLICATION FILED OCT. 31, 1921.
1,435,385.
Patented Nov. 14, 1922.
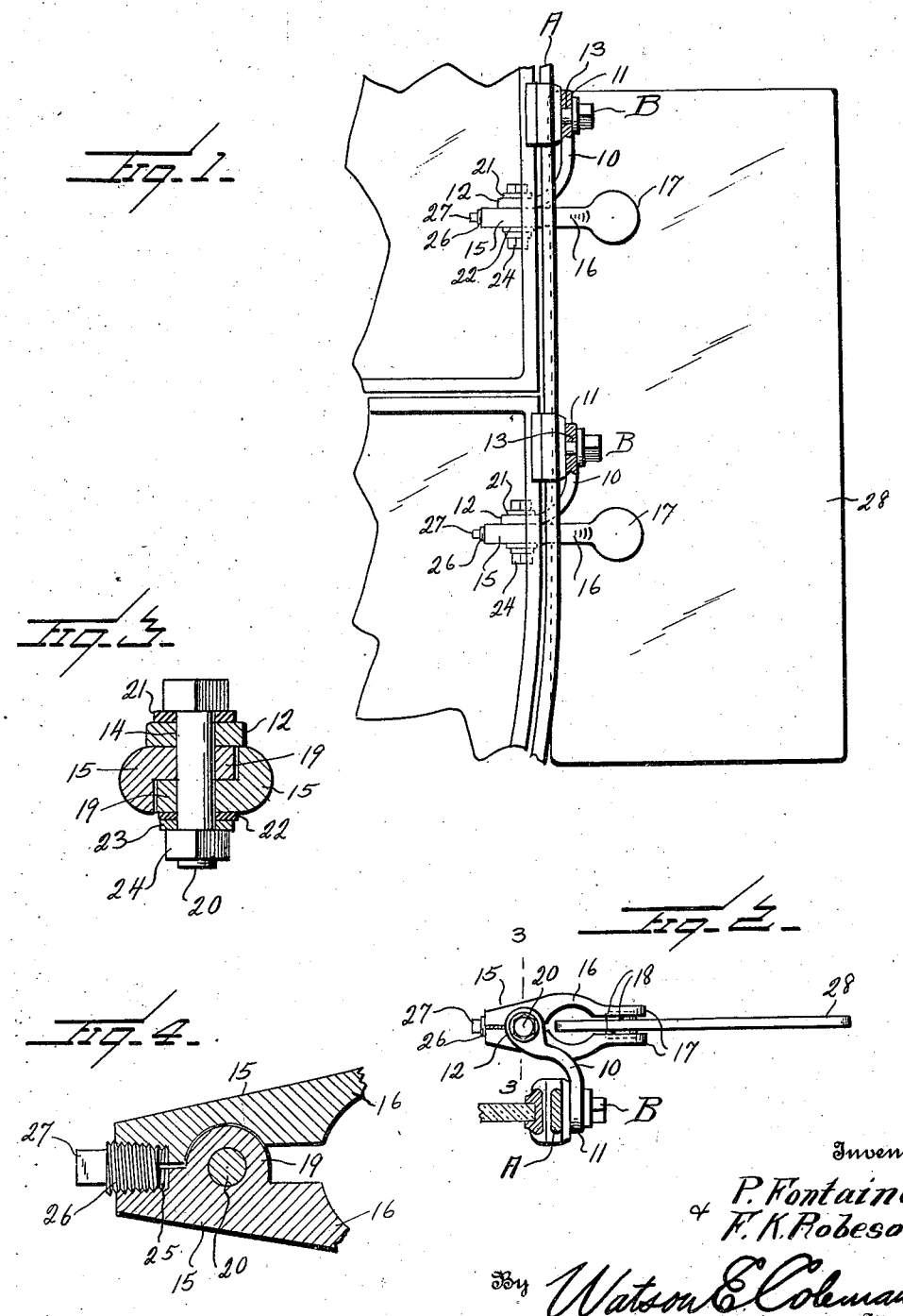
Inventors
P. Fontaine
F. K. Robeson
By Watson E. Coleman
Attorney Patented Nov. 14, 1922.

1,435,385

UNITED STATES PATENT OFFICE.

PHILLIPPE FONTAINE AND FRANK K. ROBESON, OF CHAMPAIGN, ILLINOIS.

WIND DEFLECTOR.

Application filed October 31, 1921. Serial No. 511,598.

*To all whom it may concern:*

Be it known that we, PHILLIPPE FONTAINE and FRANK K. ROBESON, citizens of the United States, residing at Champaign, in the county of Champaign and State of Illinois, have invented certain new and useful Improvements in Wind Deflectors, of which the following is a specification, reference being had to the accompanying drawings.

This invention relates to attachments for automobiles, particularly to wind deflectors designed to be associated with the ordinary windshield, and has for its object the provision of a novel device for this purpose formed with or including means for clamping the wind deflecting glass panes without any necessity whatever for boring holes therein for the passage of securing members such as is the common practice.

An important object is the provision of a wind deflector which is provided with brackets designed to be secured to the windshield frame by means of the usual studs or bolts which form a part thereof and which hold the upper and lower sections of the windshield glass in adjusted position, the present device thus obviating the necessity for making any holes in the windshield frame and thereby being capable of application by an unskilled person and without the use of special tools.

Another important object is the provision of a novel clamp for gripping the glass pane constituting the deflector, this clamping means being wedge operated and being of such formation as to hold the glass firmly and without any possibility of displacement and likewise without danger of causing cracking or breaking thereof, the wedge operated adjusting means also permitting clamping engagement upon glass of different thickness.

An additional object is the provision of a device of this character which will be simple and inexpensive in construction, easy to install, highly efficient in use, durable in service and a general improvement in the art.

With the above and other objects and advantages in view, the invention consists in the details of construction to be hereinafter more fully described and claimed, and illustrated in the accompanying drawings, in which:

Figure 1 is a front elevation showing one of the wind deflectors mounted upon a windshield;

Figure 2 is a cross sectional view through one side of the windshield showing a plan view of the deflector;

Figure 3 is an enlarged detail sectional view on the line 3—3 of Figure 2; and

Figure 4 is a fragmentary sectional view of one of the clamping devices employed.

Referring more particularly to the drawings, the letter A designates one side bar of a windshield of the type which is commonly provided with upper and lower adjusting screws B associated with and for the purpose of adjusting the positions of the upper and lower panes of the windshield. In some instances instead of screws threaded studs are provided carrying clamping nuts, but the application of the present invention is exactly the same in either instance.

In carrying out the present invention we make use of two curved bracket arms 10 associated with each side bar of the windshield and each bracket arm has upper and lower attaching portions 11 and 12 respectively formed with holes 13 and 14 respectively, the holes 13 being designed for engagement upon the screws or studs B of the windshield frame whereby the bracket arms may be held rigidly in proper position and without the employment of any other fastening means whatever. Associated with the lower attaching portion 12 of each bracket arm is a clamp which consists of a pair of members 15 outwardly bowed intermediate their ends, as indicated at 16, and having one end constituting jaws 17 which have their confronting faces recessed for the reception of resilient pads 18. Intermediate their ends the members 15 are formed with interfitting knuckles 19 which are connected by means of a bolt 20 which passes through suitable holes 14 in the lower attaching portion 12 of the arm 10. It is preferable that the bolt 20 carry a fiber washer 21 between its head and the attaching portion 12 and a second washer 22 between the under side of the assembled members 15 and a locking washer 23 engaged by the clamping nut 24, the purpose of the fiber washers being to prevent defacing the finish of the elements and the purpose of the lock washer being to prevent unscrewing of the nut 24. In this way it will be seen that the bolt 20 not only serves to pivot the clamping members 15 but also serves to secure them with respect to the bracket arms carried by the windshield. The rear ends, that is the ends of the members 15 most remote from the jaws 17 are formed with mating recesses 25 which are internally threaded for the reception of a tapered screw 26 having an angular head 27 engageable by a wrench, pliers or the like whereby to be turned for the purpose of swinging the members 15 upon the bolt 20 as a pivot for bringing the jaws 17 into clamping relation. The deflector further includes a sheet or pane of glass 28 which is engaged by the jaws 17 whereby to be held firmly in position. There are two of the bracket arms and clamping devices associated with each side of the windshield frame and it is of course apparent that the arms 10 must be formed as rights and lefts as they are not capable of interchangeable use at both sides of the windshield frame.

When the clamping members 15 are engaged upon the glass 18 the clamping action is easily regulated by adjusting the tapered screw 26 which has a wedging action so that the jaws will exert the proper pressure upon the glass regardless of the thickness thereof, a distinct advantage being the fact that it is unnecessary to provide any holes through the glass for the passage of any securing members, such holes having a weakening effect and being disadvantageous for this reason. In the actual use of the device it is to be understood that the bolts 20 associated with the clamping members should have their nuts 24 tightened to such an extent as to prevent casual movement of the deflectors during travel of the vehicle equipped with them or under the influence of a strong wind, while at the same time there should be sufficient looseness to permit the deflectors to be swung to the desired position.

From the foregoing description and a study of the drawings it will be apparent that we have thus provided a simply constructed and consequently inexpensive wind deflector attachment for ordinary windshields which may be applied without the use of special tools and without the necessity for any great degree of skill and in the minimum length of time. It is also to be observed that ample means is provided for regulating the clamping action for insuring a firm grip upon the deflector glass panes without danger of cracking the same. It is also apparent that the device is very neat in appearance and will enhance the attractiveness of the car upon which it is used.

While we have shown and described the preferred embodiment of the invention it is of course to be readily understood that we reserve the right to make such changes in the form, construction and arrangement of parts as will not depart from the spirit of the invention or the scope of the subjoined claims.

Having thus described our invention, we claim:

1. A device of the character described comprising bracket arms secured upon the sides of a windshield frame by the usual windshield glass adjusting screws or studs, a clamp carried by each bracket arm, each clamp consisting of a pair of members formed at one end with jaws carrying inserted pads, said members being formed intermediate their ends with interengaging knuckles, a bolt passing through the knuckles and through the associated bracket arm for pivoting the clamp with respect to the bracket arm and for pivoting the clamping members with respect to each other, and means associated with the ends of the clamping members remote from the jaws for regulating the pressure of the jaws upon the glass thereof.

2. In a windshield wind deflector, bracket arms adapted for engagement with the windshield frame, pairs of clamping members adapted to receive between the jaws thereof a deflecting plate, and common means pivotally connecting the clamping jaws of each pair to one another and pivotally connecting the pair to its respective bracket.

In testimony whereof we hereunto affix our signatures.

PHILLIPPE FONTAINE.
FRANK K. ROBESON.